United States Patent
Yoshikawa et al.

(10) Patent No.: US 11,401,880 B2
(45) Date of Patent: Aug. 2, 2022

(54) INJECTION CONTROL DEVICE

(71) Applicant: DENSO CORPORATION, Kariya (JP)

(72) Inventors: Kouyou Yoshikawa, Kariya (JP); Masashi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/330,698

(22) Filed: May 26, 2021

(65) Prior Publication Data

US 2021/0372337 A1 Dec. 2, 2021

(30) Foreign Application Priority Data

May 28, 2020 (JP) .............................. JP2020-093306

(51) Int. Cl.
*F02D 41/20* (2006.01)
*F02D 41/38* (2006.01)
*F02M 51/06* (2006.01)

(52) U.S. Cl.
CPC ............. *F02D 41/20* (2013.01); *F02D 41/38* (2013.01); *F02M 51/06* (2013.01); *F02D 2041/2051* (2013.01)

(58) Field of Classification Search
CPC .. F02D 41/20; F02D 41/38; F02D 2041/2051; F02M 51/06
See application file for complete search history.

(56) References Cited

U.S. PATENT DOCUMENTS

| | | | |
|---|---|---|---|
| 2012/0116651 A1* | 5/2012 | Miyamoto | F02D 41/221 701/103 |
| 2012/0234294 A1* | 9/2012 | Nakamura | F02D 41/24 123/436 |
| 2016/0069292 A1* | 3/2016 | Morihiro | F02D 41/0085 123/299 |
| 2016/0208727 A1* | 7/2016 | Ito | F02D 41/221 |
| 2017/0226950 A1* | 8/2017 | Tanaka | F02D 41/20 |
| 2020/0284214 A1 | 9/2020 | Inaba et al. | |

FOREIGN PATENT DOCUMENTS

| | | |
|---|---|---|
| JP | 2007-231850 A | 9/2007 |
| JP | 2016-033343 A | 3/2016 |
| JP | 2018-184861 A | 11/2018 |

* cited by examiner

*Primary Examiner* — Joseph J Dallo
(74) *Attorney, Agent, or Firm* — Posz Law Group, PLC (57) ABSTRACT

When injecting fuel from a fuel injection valve by energizing thereof, an energization time correction amount calculator performs an area correction of an electric current flowing in the fuel injection valve, and calculates an energization time correction amount. An injection instruction state determiner determines an inter-cylinder injection instruction interval among cylinders which inject fuel in series or determines an injection instruction overlapping state. An upper guard value setter sets an upper guard value of the energization time correction amount based on the inter-cylinder injection instruction state determined by the injection instruction state determiner.

15 Claims, 12 Drawing Sheets

INJECTION CONTROL DEVICE

CROSS REFERENCE TO RELATED APPLICATION

The present application is based on and claims the benefit of priority of Japanese Patent Application No. 2020-093306, filed on May 28, 2020, the disclosure of which is incorporated herein by reference.

TECHNICAL FIELD

The present disclosure generally relates to an injection control device that controls valve opening/closing of a fuel injection valve.

BACKGROUND INFORMATION

The injection control device is used to inject fuel into an internal combustion engine by opening and closing a fuel injection valve. The injection control device controls valve opening by energizing an electrically driveable fuel injection valve with an electric current. In recent years, an ideal current profile of an energization current based on an instruction injection amount has been defined, and an injection control device controls valve opening by applying an electric current to a fuel injection valve based on the ideal current profile.

SUMMARY

It is an object of the present disclosure to provide an injection control device capable of appropriately operating a technique for correcting an energization time for a fuel injection valve.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
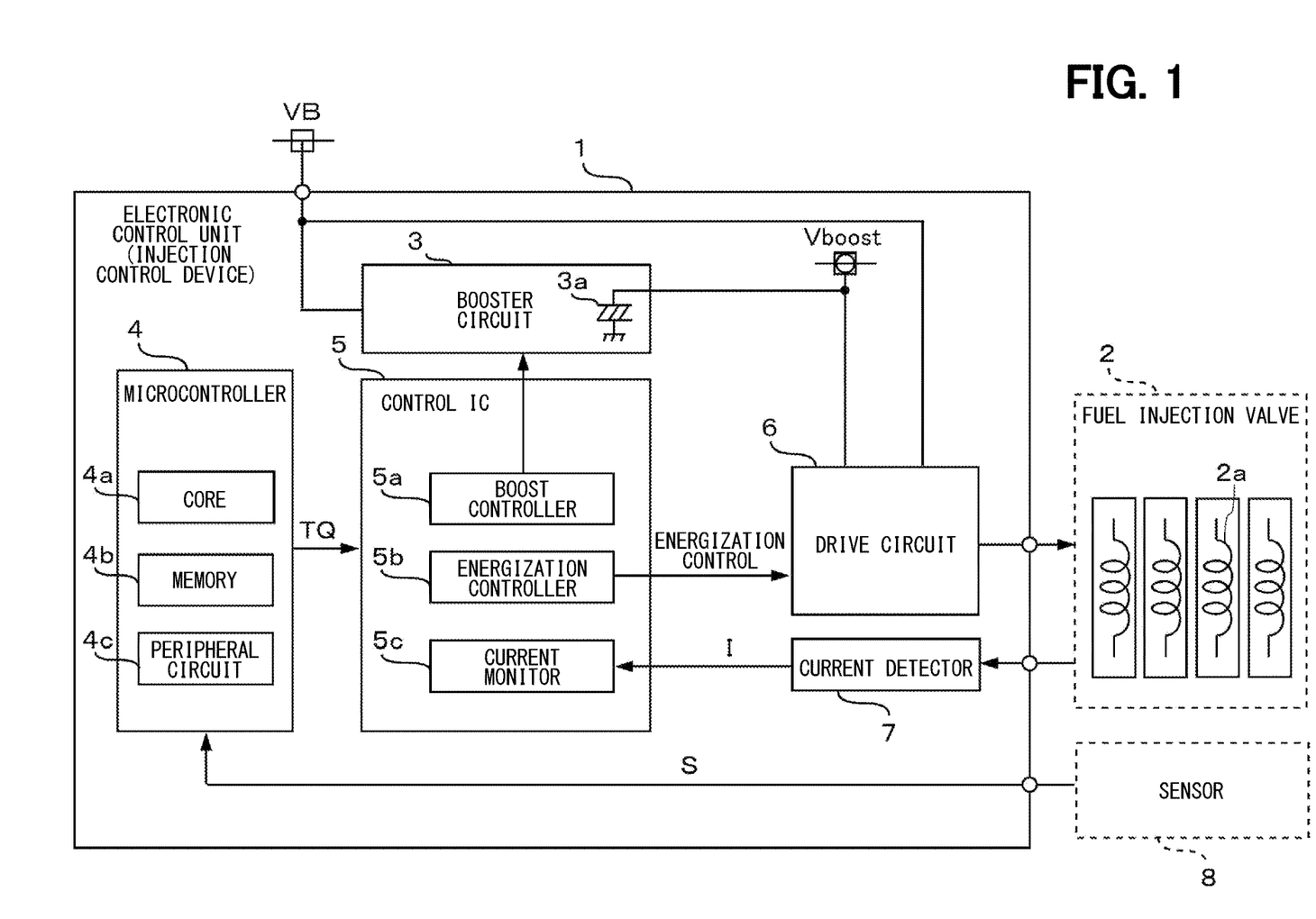
FIG. 1 is an electrical configuration diagram of an injection control device according to an embodiment.

Hereinafter, an embodiment of an injection control device will be described with reference to the drawings. As shown in FIG. 1, an electronic control unit 1 (ECU) is configured as an injection control device that drives and controls a solenoid-type fuel injection valve 2 (also called an injector) which injects and supplies fuel directly to cylinders of an internal combustion engine mounted on a vehicle such as an automobile. Hereinafter, an example of such device applied as the electronic control unit 1 for controlling a gasoline engine will be described, but it may also be applied to an electronic control device for controlling a diesel engine. Although the fuel injection valve 2 for four cylinders is shown in FIG. 1, it can be applied to two or more cylinders.

The electronic control unit 1 includes an electrical configuration as a booster circuit 3, a microcontroller 4, a control IC 5, a drive circuit 6, and a current detector 7. The microcontroller 4 is configured to include a processor and/or one or more cores 4a, a memory 4b such as ROM and RAM, and a peripheral circuit 4c such as an A/D converter, and performs various controls based on a program stored in the memory 4b and a sensor signal S acquired from various sensors 8.

For example, the sensors 8 for a gasoline engine include a crank angle sensor that outputs a pulse signal each time a crank shaft rotates by a predetermined angle, a water temperature sensor that is arranged in a cylinder block of an internal combustion engine to detect a cooling water temperature, an intake amount sensor that detects an air intake amount, a fuel pressure sensor that detects a fuel pressure at the time of fuel injection from the fuel injection valve 2, an A/F sensor that detects the air-fuel ratio of the internal combustion engine, that is, the A/F value (none of the above is shown in the drawing), and the like.

The microcontroller 4 calculates an engine speed (i.e., engine rotation number) from a pulse signal of the crank angle sensor, and acquires an accelerator opening degree from an accelerator signal. The microcontroller 4 calculates a target torque required for the internal combustion engine based on the accelerator opening degree, a hydraulic pressure, and the A/F value, and calculates a required injection amount, which serves as a target, based at least partly on the target torque.

Further, the microcontroller 4 calculates an energization instruction time Ti of an instruction TQ based on the required injection amount as a target and the fuel pressure detected by the fuel pressure sensor. The microcontroller 4 calculates an injection start instruction time t0 for each of the cylinders #1 to #4 based on the sensor signal S input from the various sensors 8 described above, and outputs the fuel injection instruction TQ to the control IC 5 at the injection start instruction time to.

The control IC 5 is, for example, an integrated circuit device using an ASIC, and includes, for example, a control entity made up by a logic circuit, a CPU and the like, a storage unit such as a RAM, a ROM, or an EEPROM, and a comparator using a comparator circuit (none of which is shown), and is configured to perform various controls based on hardware and software. The control IC 5 has functions as a boost controller 5a, an energization controller 5b, and a current monitor 5c.

Figure 2:
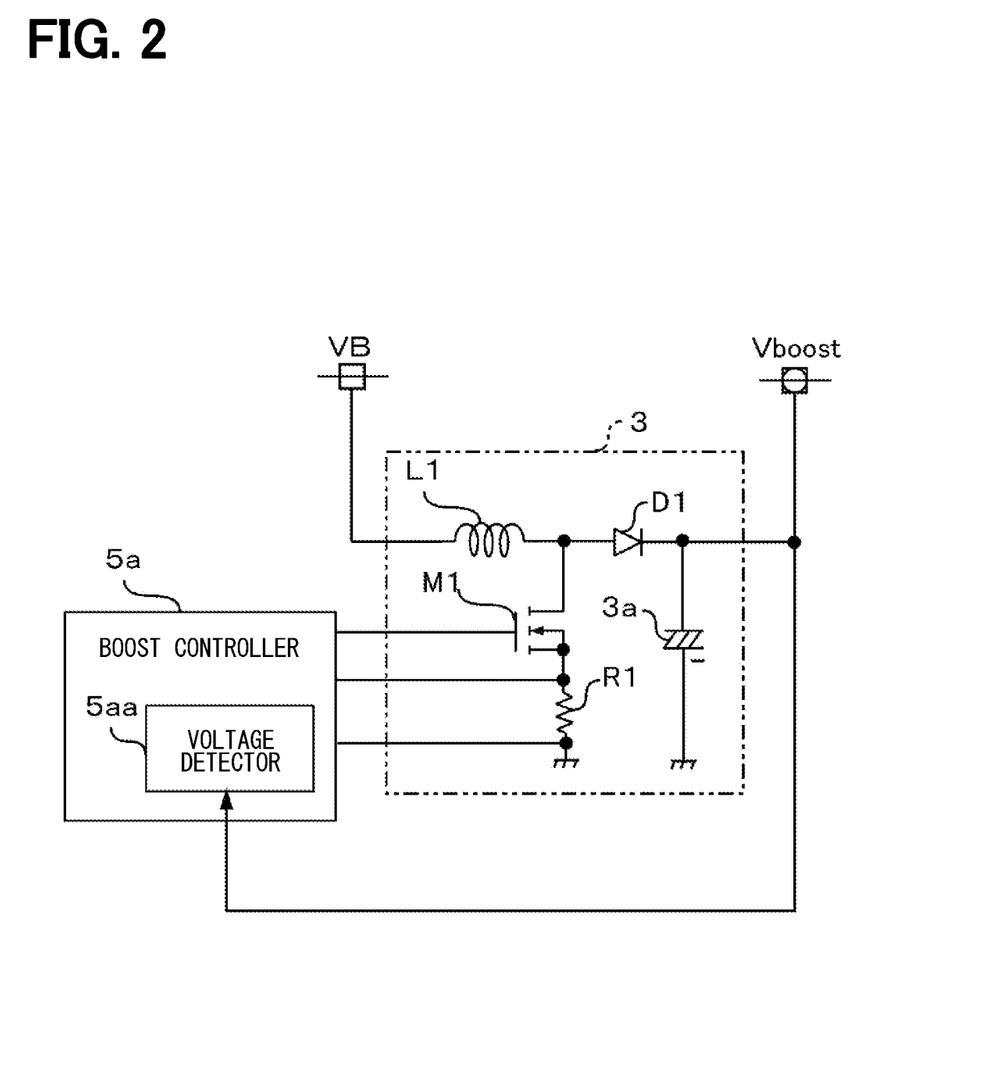
FIG. 2 is an example of an electrical configuration of a booster circuit.

As illustrated in FIG. 2, the booster circuit 3 is composed of a booster type DCDC converter in which an inductor L1, a switching element M1, a diode D1, a current detection resistor R1, and a charging capacitor 3*a* are connected in the illustrated form. The booster circuit 3 receives an input of a battery voltage VB to perform a boost operation, and charges the charging capacitor 3*a* serving as a charging unit with a boost voltage Vboost. The boost controller 5*a* boosts and controls the battery voltage VB input to the booster circuit 3 by applying a boost control pulse to the switching element M1. The boost controller 5*a* detects the boost voltage Vboost of the charging capacitor 3*a* of the booster circuit 3 by a voltage detector 5*aa*, charges the charging capacitor 3*a* to a full charge voltage Vfull, and supplies the charge to the drive circuit 6. The charging capacitor 3*a* holds electric power to be supplied to the fuel injection valve 2 that directly injects fuel into the plurality of cylinders #1 to #4.

Figure 3:
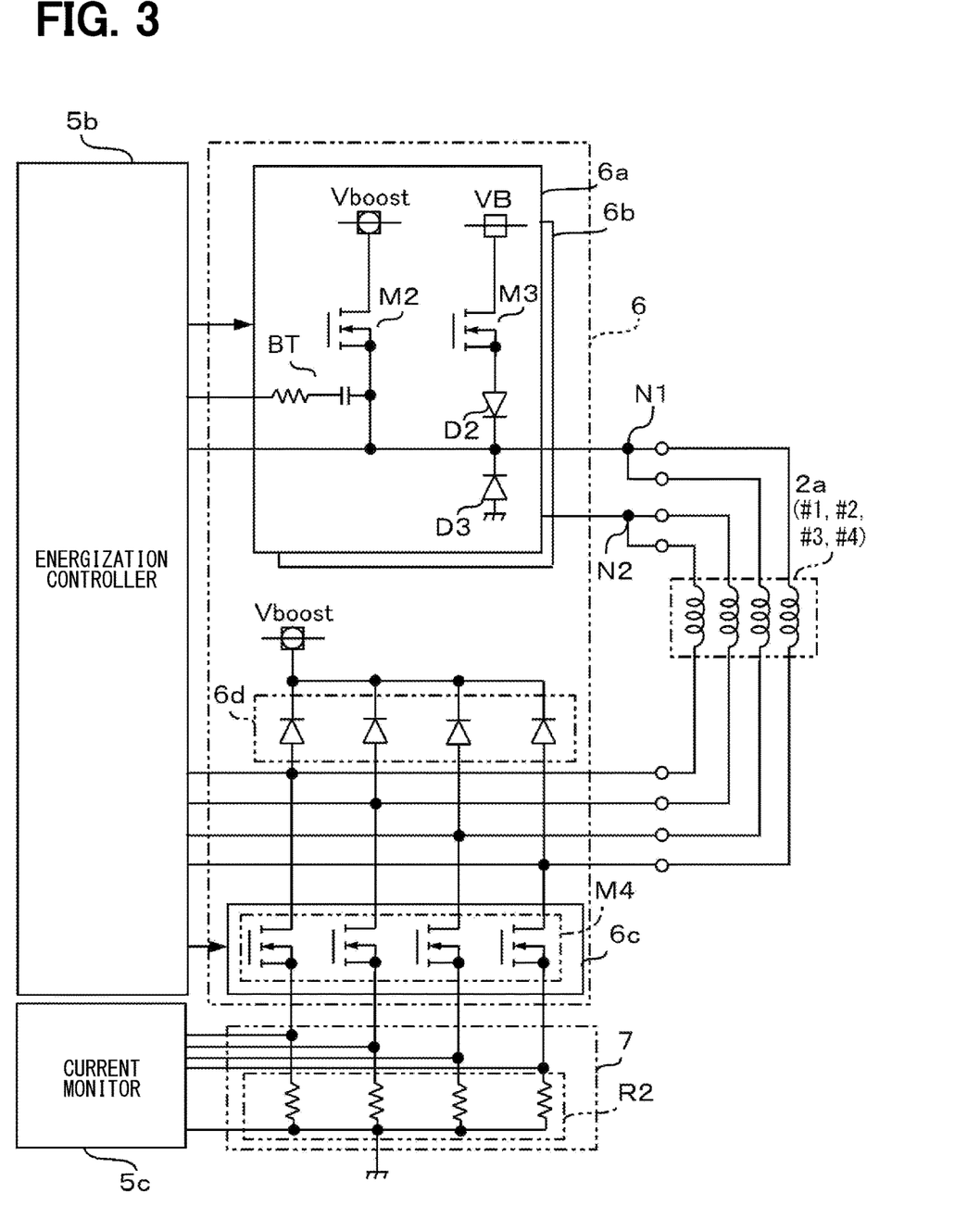
FIG. 3 is an example of an electrical block configuration of a drive circuit.

In FIG. 1, the drive circuit 6 inputs the battery voltage VB and the boost voltage V boost. The drive circuit 6 directly injects fuel from the fuel injection valve 2 into the cylinders #1 to #4 by applying a voltage to a solenoid coil 2*a* based on the energization control of the energization controller 5*b* of the control IC 5. As illustrated in FIG. 3, the drive circuit 6 includes upstream circuits 6*a* and 6*b* connected upstream of the solenoid coil 2*a* and downstream circuits 6*c* connected downstream of the solenoid coil 2*a*. The upstream side of the pair of solenoid coils 2*a* for two cylinders is commonly connected to a node N1, and the upstream side of the other pair of solenoid coils 2*a* is commonly connected to a node N2. The upstream circuits 6*a* and 6*b* are connected to the nodes N1 and N2 so as to be energized, respectively, and are connected so that a voltage can be applied to the fuel injection valves 2 for two cylinders, respectively. The upstream circuits 6*a* and 6*b* have the same configuration as each other. Here, the configuration of the upstream circuit 6*a* will be described, and the configuration description of the upstream circuit 6*b* will be omitted.

The MOSFET_M2 is connected between the supply node of the boost voltage Vboost and the node N1. A boost circuit BT is connected to a source of MOSFET_M2, and the boost circuit BT can improve a supply capacity of the boost voltage Vboost. Between the supply node of the battery voltage VB and the node N1, a drain-source position of MOSFET_M3 and an anode-cathode position of a diode D2 are connected. As a result, when the MOSFET_M2 is turned on, the energization controller 5*b* can apply the boost voltage Vboost to the solenoid coil 2*a* of the fuel injection valve 2 for two cylinders through the node N1. Further, if the energization controller 5*b* turns on the MOSFET_M3, the battery voltage VB can be applied to the solenoid coil 2*a* of the fuel injection valve 2 for two cylinders through the node N1. Note that the diode D2 is provided to prevent backflow of the boost voltage Vboost. A reflux diode D3 is connected to a position between a ground and the node N1.

On the other hand, a downstream circuit 6*c* is provided by cylinder selection switches for selecting cylinders #1 to #4 for fuel injection, and is composed of MOSFET_M4. The energization controller 5*b* can energize the desired solenoid coil 2*a* by turning on one or two switches represented as the MOSFET_M4 at a desired timing. A regenerative circuit 6*d* is configured between the downstream side of the solenoid coil 2*a* and the supply node of the boost voltage Vboost. The regenerative circuit 6*d* is composed of diodes, and the surplus electric power stored in the solenoid coil 2*a* can be regenerated in the charging capacitor 3*a*. The current detector 7 detects the electric current flowing from the solenoid coil 2*a* through the downstream circuit 6*c*. The current detector 7 is composed of a current detection resistor R2, and is configured by being connected in series between the source and ground of MOSFET_M4. The current monitor 5*c* of the control IC 5 is configured by using, for example, a comparison unit using a comparator, an A/D converter and the like (neither shown), and monitors the electric current flowing through the solenoid coil 2*a* of the fuel injection valve 2 via the current detector 7.

Figure 4:
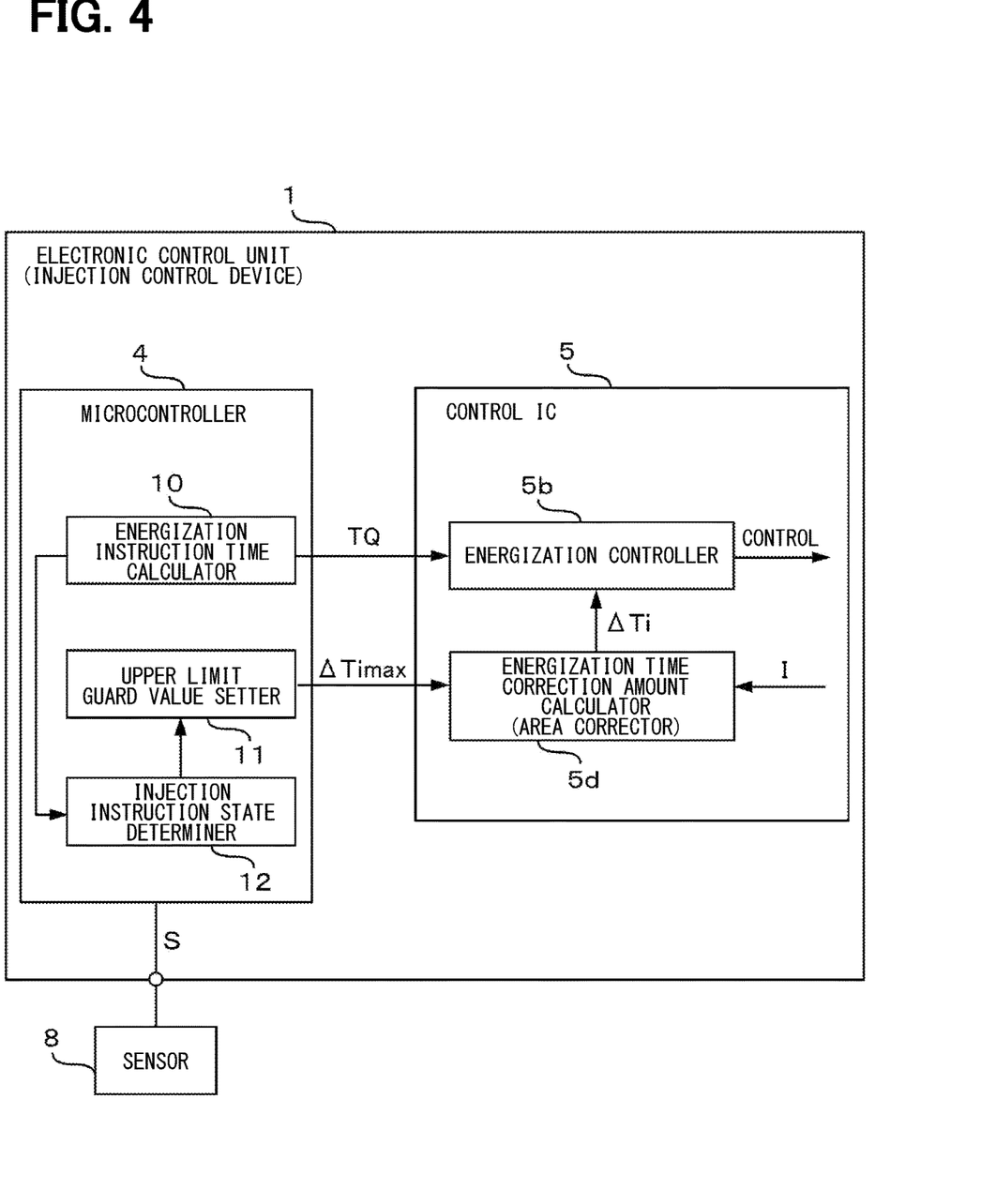
FIG. 4 is an explanatory diagram of communicated information between a microcontroller and a control IC.

Further, FIG. 4 schematically shows the functional configurations of the microcontroller 4 and the control IC 5. The microcontroller 4 functions as an energization instruction time calculator 10, an upper limit guard value setter 11, and an injection instruction state determiner 12 by executing a program stored in the memory 4*b* by the core 4*a*. The control IC 5 also has functions of the boost controller 5*a*, of the energization controller 5*b*, and of the current monitor 5*c* described above, as well as a function of an energization time correction amount calculator 5*d* serving as an area correction unit. The energization instruction time calculator 10 of the microcontroller 4 calculates the required injection amount in each of the cylinders #1 to #4 in one cycle based on the sensor signal S of various sensors 8, and sets an injection mode, an injection start instruction time, and an each cylinder injection interval for each of the cylinders #1 to #4.

The injection mode is determined by the number of injections for each of the cylinders #1 to #4 in one cycle. The microcontroller 4 calculates the injection start instruction time t0 for each of the cylinders #1 to #4 based on the engine speed calculated by the pulse signal of the crank angle sensor. Each cylinder injection interval indicates an injection interval in each of the cylinders #1 to #4.

The microcontroller 4 calculates the energization instruction time Ti (see FIG. 7) of the instruction TQ (see FIG. 10) of each cylinder, and instructions the energization controller 5*b* of the control IC 5. Note that, when the energization instruction time Ti is input to the control IC 5, the energization time correction amount calculator 5*d* calculates the energization time correction amount ΔTi for each injection, and corrects the energization instruction time Ti instructed by the microcontroller 4 in real time. During such correction, it is difficult for the microcontroller 4 to estimate the energization time correction amount ΔTi calculated by the control IC 5 in real time.

In order to prevent overcorrection of the energization time correction amount ΔTi while preventing abnormal control by the control IC 5, the microcontroller 4 sets an upper limit guard value ΔTimax of the energization time correction amount ΔTi in advance by the upper limit guard value setter 11, and instructs the control IC 5. During such setting, the upper limit guard value setter 11 of the microcontroller 4 sets the upper limit guard value ΔTimax of the energization time correction amount ΔTi based on an inter-cylinder injection instruction interval Tint between multiple cylinders or an injection instruction overlapping state determined by the injection instruction state determiner 12.

The injection instruction state determiner 12 of the microcontroller 4 determines the inter-cylinder injection instruction interval Tint. The injection instruction state determiner 12 determines the inter-cylinder injection instruction state by the inter-cylinder injection instruction interval Tint. During such determination, the injection instruction state determiner 12 may determine the inter-cylinder injection instruction state based on the injection mode, or may determine the inter-cylinder injection instruction state based on (a) the injection start instruction time t0 and (b) the energization instruction time Ti (t0→te) to the fuel injection valve 2 of each of the cylinders #1 to #4 driven by using the same charging capacitor 3a. Further, the injection instruction state determiner 12 may determine the inter-cylinder injection instruction state based on the injection instruction interval Tint to the fuel injection valves 2 of the multiple cylinders #1 to #4 driven by using the same charging capacitor 3a. Further, the injection instruction state determiner 12 determines an injection instruction overlap time when the injection instructions overlap between/among the multiple cylinders #1 to #4. The inter-cylinder injection instruction interval Tint is, for example in FIG. 7, calculable from the injection start instruction time t0 (#3) to the cylinder #3, the injection start instruction time t0 (#1) to the cylinder #1 before that, and the energization instruction time Ti to the cylinder #1 (#1) (t0 (#1)→te (#1)). In such case, more specifically, the inter-cylinder injection instruction interval Tint is calculable by an equation Tint=t0 (#3)−{t0 (#1)+Ti (#1)}. The microcontroller 4 calculates the injection start instruction time t0 of each of the cylinders #1 to #4 based on the engine speed calculated by the pulse signal of the crank angle sensor. The microcontroller 4 includes an internal timer inside the peripheral circuit 4c, and the internal timer enables calculation of the inter-cylinder injection instruction interval Tint which is a duration of time from an injection end instruction time te of one cylinder (for example, #1) to the injection start instruction time t0 of the next cylinder (for example, #3).

Hereinafter, a method for setting the upper limit guard value ΔTimax and a method for controlling the area correction (i.e., an upper limit guard value setting method and an area size correction control method) will be described in detail. When the battery voltage VB is applied to the electronic control unit 1, the microcontroller 4 and the control IC 5 are activated. The boost controller 5a of the control IC 5 boosts the output voltage of the booster circuit 3 by outputting a boost control pulse to the booster circuit 3. The boost voltage Vboost is charged up to a full charge voltage Vfull that exceeds the battery voltage VB.

When the energization control is started, the microcontroller 4 calculates the required injection amount in each of the cylinders #1 to #4. Subsequently, the injection mode when injecting into each of the cylinders #1 to #4, the injection start instruction time t0 and the energization instruction time Ti (t0→te), and the injection interval (Tint) in each of the cylinders #1 to #4 are set.

Figure 5:
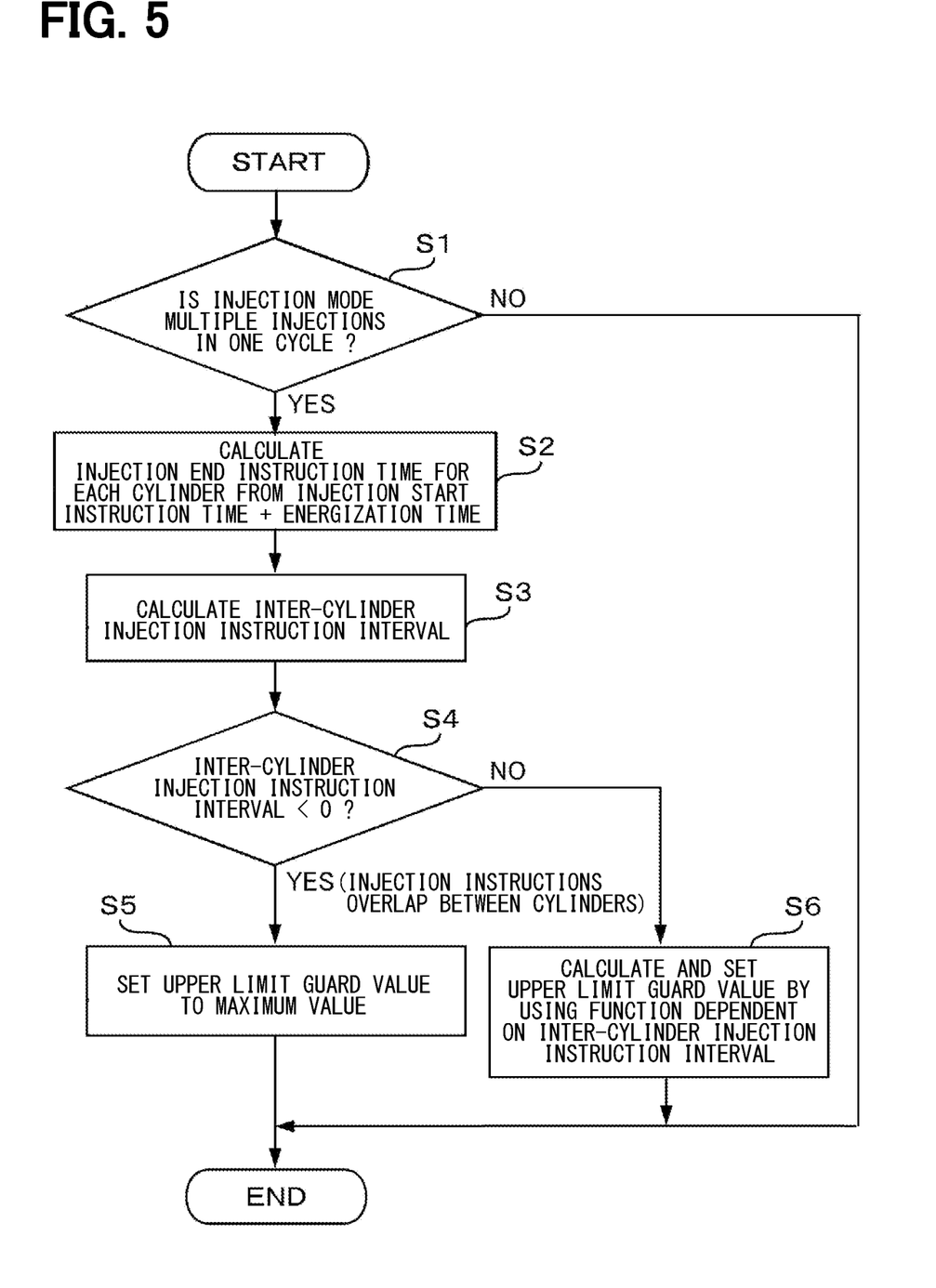
FIG. 5 is a flowchart showing a flow of setting an upper limit guard value.

When the microcontroller 4 sends instruction to the control IC 5 regarding the energization instruction time Ti of the instruction TQ of each cylinder, the microcontroller 4 instructs, at the same time, the upper limit guard value ΔTimax to the control IC 5. Prior to such instruction, the processing shown in FIG. 5 is executed. First, the microcontroller 4 determines in S1 whether or not the injection mode is multiple injections in one cycle.

Figure 7:
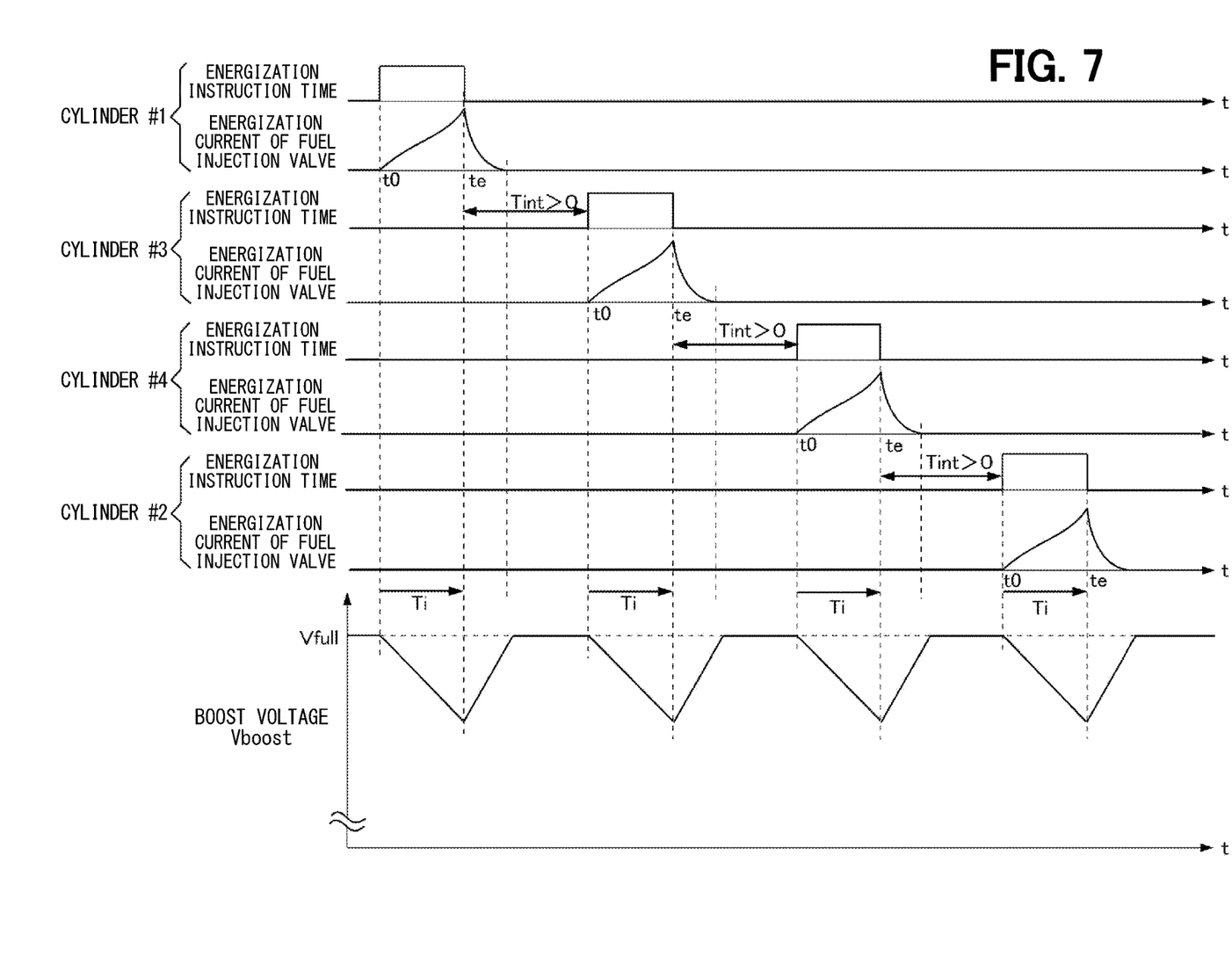
FIG. 7 is an example of changes in an energization current and a boost voltage of a fuel injection valve of each cylinder in one cycle.

If the injection mode is one injection in one cycle, a continuous inter-cylinder injection instruction interval Tint becomes a positive value as shown in FIG. 7. In such case, the inter-cylinder injections do not overlap, and also a sufficient inter-cylinder injection instruction interval Tint can be secured for charging the boost voltage Vboost. In such a case, the microcontroller 4 determines NO in S1 and exits the routine shown in FIG. 5.

If the injection mode is multiple injections in one cycle, the microcontroller 4 determines YES in S1, and calculates the injection end instruction time te by adding the energization instruction time Ti to the injection start instruction time t0 in S2. Then, the microcontroller 4 calculates the inter-cylinder injection instruction interval Tint in S3. In S4, the microcontroller 4 determined in S4 whether or not multiple injection instructs overlap between the injection cylinders #1, #3, #4, #2 . . . , i.e., between the two cylinders that inject fuel in a series operation, when the inter-cylinder injection instruction interval Tint is less than 0, that is, when the electronic control unit 1 performs injection control for the cylinders #1, #3, #4, #2, in order.

Figure 8:
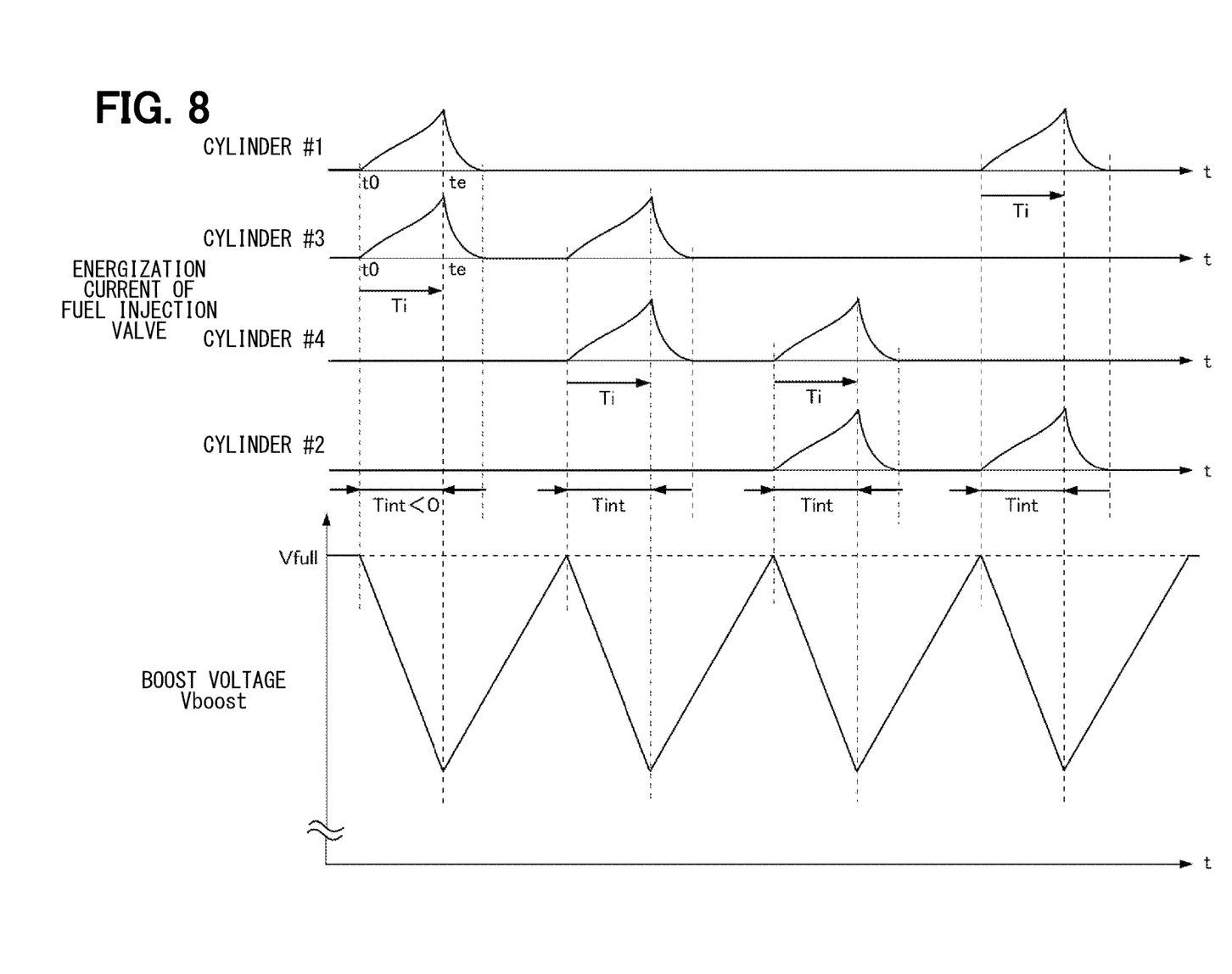
FIG. 8 is another example of changes in the energization current and boost voltage of the fuel injection valve of each cylinder in one cycle.
Figure 9:
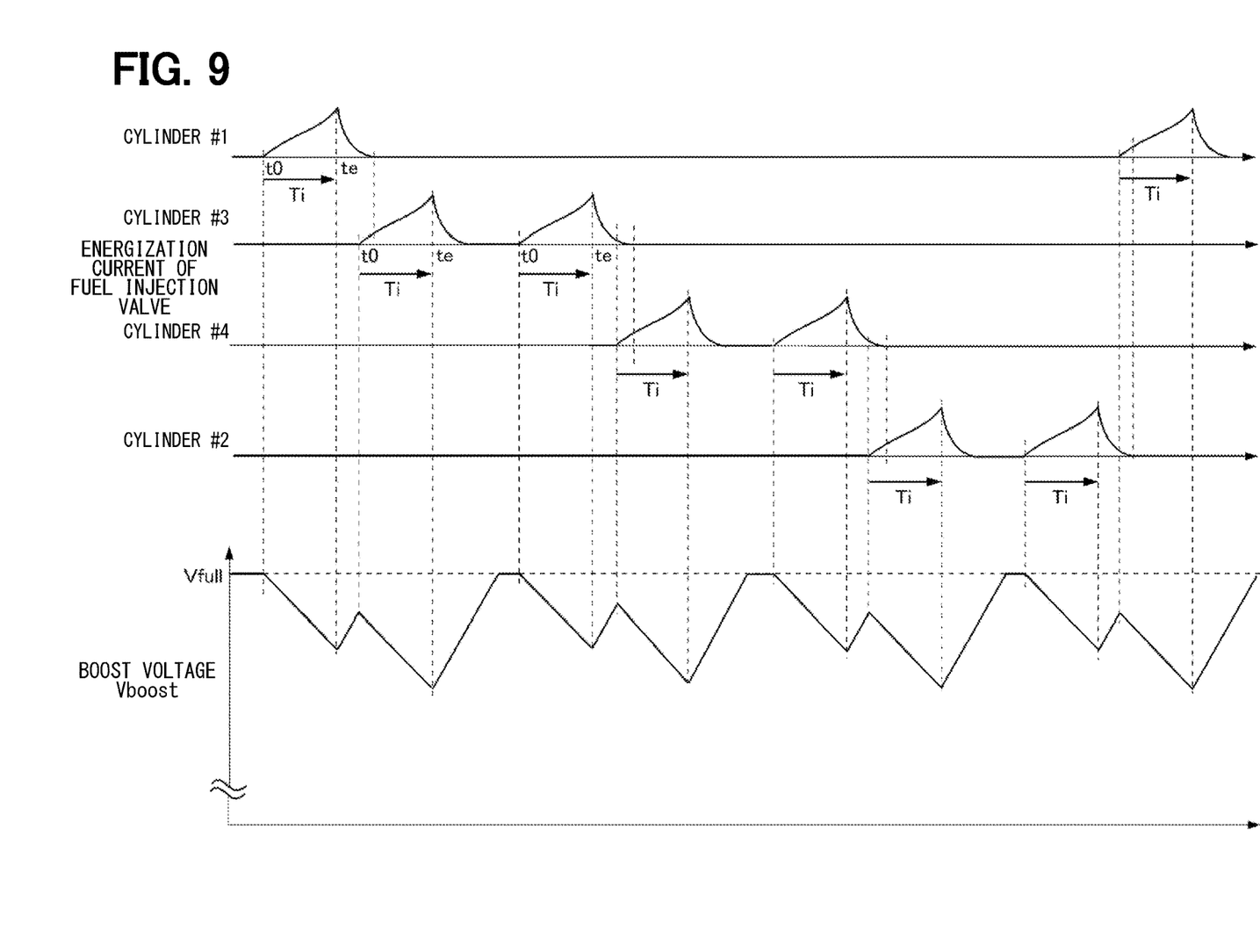
FIG. 9 is yet another example of changes in the energization current and boost voltage of the fuel injection valve of each cylinder in one cycle.

As shown in FIG. 8, when injection instructs overlap between multiple cylinders, for example, cylinders #1 and #3, the drive circuit 6 applies the charging power of the charging capacitor 3a of the booster circuit 3 to the fuel injection valves 2 of the multiple cylinders simultaneously, and, the drive circuit 6 and the fuel injection valve 2 consume a large amount of charging power of the charging capacitor 3a, and the boost voltage Vboost charged in the charging capacitor 3a drops quickly.

Figure 6:
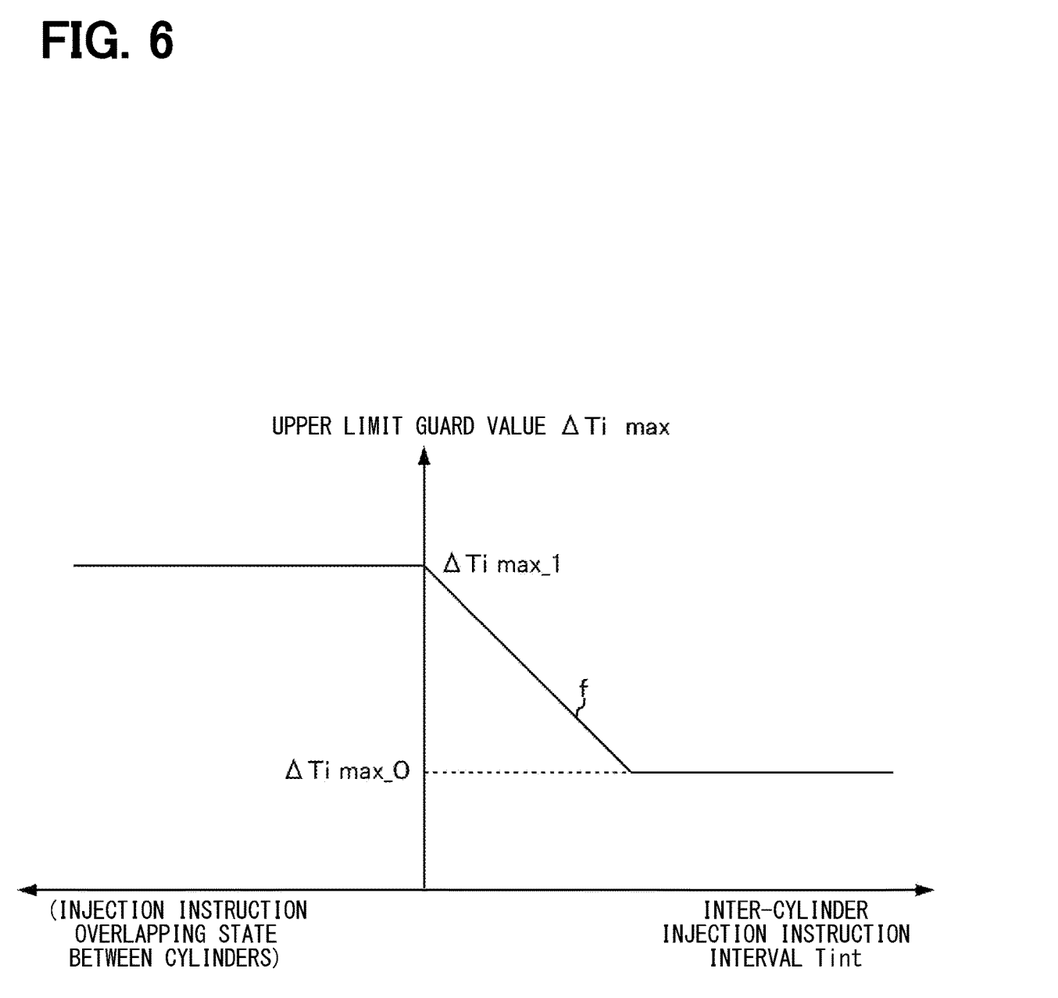
FIG. 6 is an example of a characteristic of dependence of an upper limit guard value on an injection interval between cylinders.

Therefore, in a state where the injection instructions to the fuel injection valves 2 of the multiple cylinders overlap, that is, in the injection instruction overlapping state, the microcontroller 4 determines YES in S4, and the upper limit guard value setter 11 sets the upper limit guard value ΔTimax to a maximum value ΔTimax_1 in S5. See the upper limit guard value ΔTimax of the inter-cylinder injection instruction interval 0 in FIG. 6. On the contrary, if the injection instructions to the fuel injection valves 2 of the multiple cylinders do not overlap, the microcontroller 4 determines NO in S4, and the upper limit guard value setter 11 in S6 calculates and sets the upper limit guard value ΔTimax by a function f that depends on the injection instruction interval Tint. As shown in FIG. 6, it may be desirable to calculate and set the upper limit guard value ΔTimax by the function f that increases the upper limit guard value ΔTimax of the energization time correction amount ΔTi as the inter-cylinder injection instruction interval Tint is shortened. The function f is an example of a linear decrease, but the function f is not limited to such example. If the microcontroller 4 may be configured to set the upper limit guard value ΔTimax to a predetermined lower limit value ΔTimax_0 when the injection instruction interval Tint exceeds a certain value.

After setting the upper limit guard value ΔTimax in such manner, the microcontroller 4 transmits the upper limit guard value ΔTimax to the control IC 5 together with the instruction TQ. When the energization instruction time Ti of the instruction TQ is input to the control IC 5, the control IC 5 controls the energization controller 5b to perform energization control of the fuel injection valve 2 via the drive circuit 6. When the energization time correction amount calculator 5d of the control IC 5 drives, with electric current, the fuel injection valve 2 by the energization controller 5b to inject fuel from the fuel injection valve 2, the energization time correction amount calculator 5d calculates the energization time correction amount ΔTi by acquiring from the current monitor 5c an electric current I flowing through the fuel injection valve 2 and by performing area correction of such electric current. During such calculation, the energization time correction amount calculator 5d calculates the energization time correction amount ΔTi with the upper limit guard value ΔTimax input from the microcontroller 4 as the upper limit thereof.

When the energization time correction amount calculator 5d calculates the energization time correction amount ΔTi, the energization time correction amount calculator 5d feeds back such amount ΔTi to the energization controller 5b. The energization controller 5b performs energization control of the fuel injection valve 2, by adding the energization time correction amount ΔTi in real time to the energization instruction time Ti of the instruction TQ input corresponding to a certain injection.

The control IC 5 stores, in an internal memory, a normal current profile PI which provides a target current for energizing the fuel injection valve 2, and performs a peak current control, which achieves a target peak current Ipk by applying the boost voltage Vboost to the fuel injection valve 2 under control of the energization controller 5b based on the normal current profile PI (the ideal or theoretical or optimal or design current profile).

Figure 10:
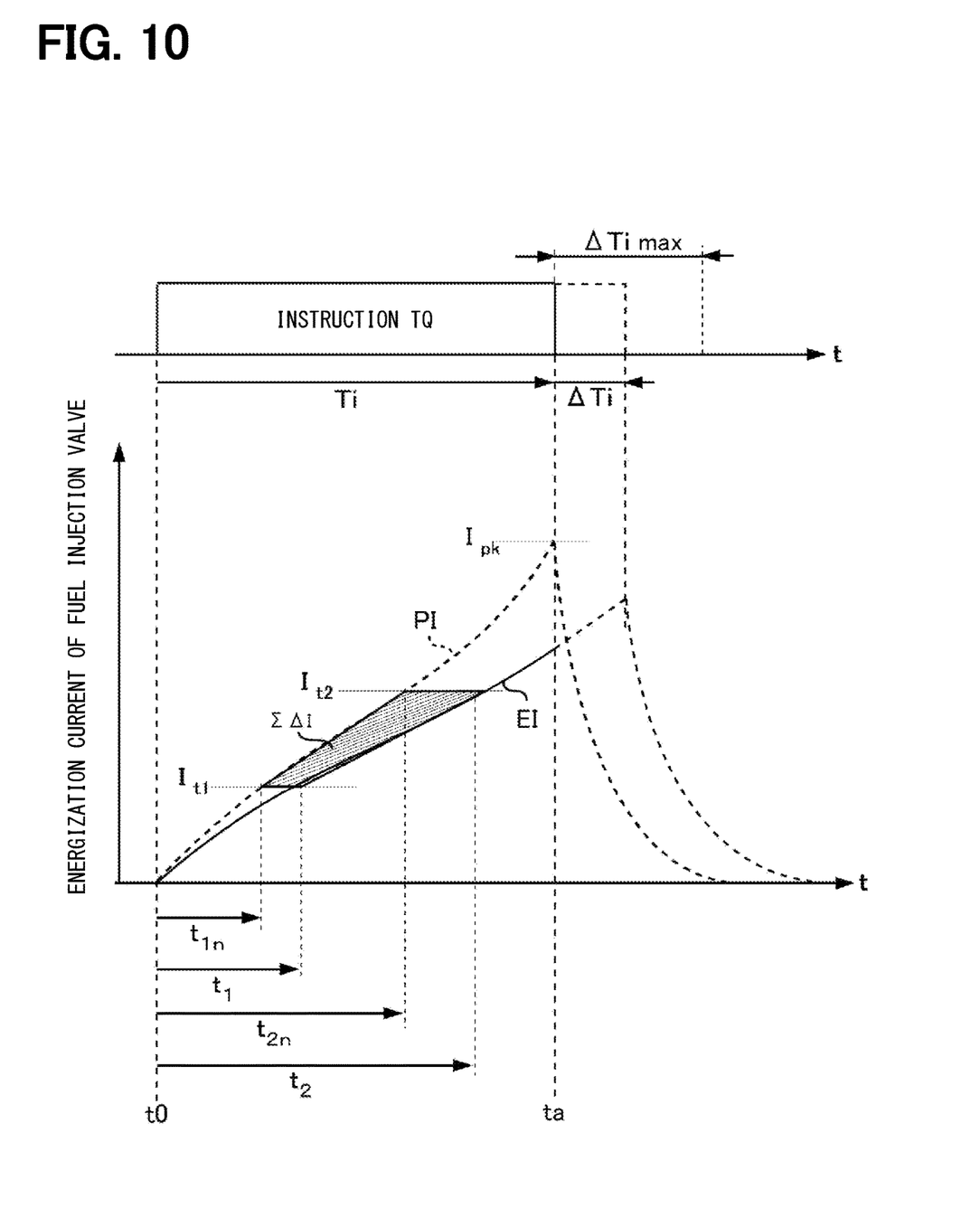
FIG. 10 is an explanation of a method of calculating an energization instruction time correction amount and an example of setting the upper limit guard value.

The control IC 5 continues to apply the boost voltage Vboost between the terminals of the fuel injection valve 2 until the target peak current Ipk indicated by the normal current profile PI is achieved based on the energization instruction time Ti of the instruction TQ. An energization current EI of the fuel injection valve 2 then sharply rises and opens the valve 2. As shown in FIG. 10, the energization current EI of the fuel injection valve 2 changes non-linearly based on the structure of the fuel injection valve 2.

The energization time correction amount calculator 5d calculates an integrated current difference ΣΔI between the normal current profile PI and the energization current EI that energizes the fuel injection valve 2. Note, technically a current integrated over time is a charge (in coulombs, wherein coulombs equals amperes×seconds). An area between the curves of PI and EI is equivalent to an integrated current difference (a charge difference). In one embodiment, and integrated area of PI is an area below the PI curve from t0 to ta, and an integrated area of EI is a measured/calculated area below the EI curve from t0 to either ta or to a time when an EI peak is reached (such as ta plus ΔTi). Since the integrated current difference ΣΔI is an area surrounded by a non-linear current curve, a calculation load tends to be large for detailed calculation. Therefore, as shown in FIG. 10 and an equation (1), an area size of a trapezoid having (t, I)=(t1n, It1), (t1, It1), (t2n, It2), (t2, It2) as vertices may be calculated for approximation of the integrated current difference ΣΔI. Note, in one embodiment, ΣΔI may be described as an area (a charge) associated with or proportional (see the correction coefficient α discussed below) to a difference between the ideal charge (area under PI from t0 to ta) and the estimated delivered charge without any correction (area under EI from t0 to ta).

(Equation 1)

$$\Sigma\Delta I = \{(t_1 - t_{1n}) + (t_2 - t_{2n})\} \times (I_2 - I_1) \div 2 \tag{1}$$

The energization time correction amount calculator 5d calculates the integrated current difference ΣΔI between (i) the normal current profile PI from an ideal reach time t1n reaching a current threshold value It1 to an ideal reach time t2n reaching a current threshold value It2, and (ii) the energization current EI of the fuel injection valve 2 from a reach time t1 actually reaching the current threshold value It1 to a reach time t2 actually reaching a current threshold value It2. In such manner, the energization time correction amount calculator 5d can easily calculate the integrated current difference ΣΔI by detecting the reach times t1 and t2 at which the current threshold values It1 and It2 are reached.

Further, the energization time correction amount calculator 5d calculates a shortage energy Ei (i.e., an amount of insufficiency) by multiplying a correction coefficient α by the integrated current difference ΣΔI as shown in an equation (2). The correction coefficient α is a coefficient used for estimating the current difference between the normal current profile PI, which is the target current flowing through the fuel injection valve 2, and the actual energization current EI, and is a coefficient calculated in advance depending on the load characteristics of the fuel injection valve 2 and the like. Note, technically the "shortage energy Ei" is an estimated charge difference, as described above. The shortage energy Ei may be described as a shortage charge. In another embodiment, not shown, the instantaneous voltage Vboost (t) is also considered such that a power (current times voltage) is integrated over time to yield an energy delivered (Joules), and a "true" shortage energy may be estimated, instead of a shortage charge.

(Equation 2)

$$Ei = \Sigma\Delta I \times \alpha = \{(t_1 - t_{1n}) + (t_2 - t_{2n})\} \times (I_2 - I_1) \div 2 \times \alpha \tag{2}$$

Figure 11:
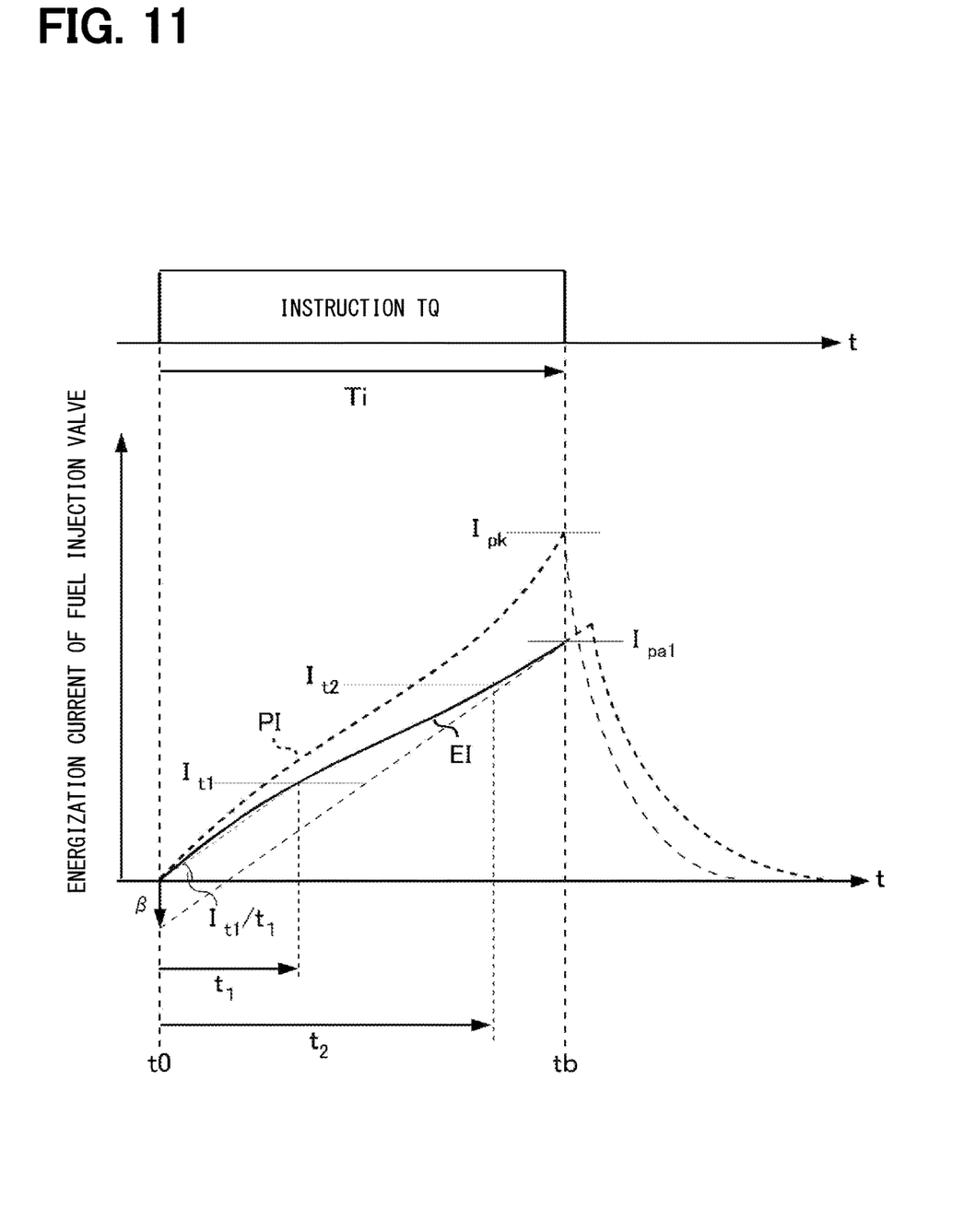
FIG. 11 is an explanatory diagram of a method of calculating an energization time correction amount.

As shown in FIG. 11, the energization time correction amount calculator 5d calculates a current gradient from the injection start instruction time t0 to the reach time t1 at which the electric current reaches the current threshold value It1, adds a correction coefficient β as an intercept, and calculates an estimated peak current value Ipa1 at the time when the energization instruction time Ti indicated by the instruction TQ has lapsed. At such timing, the estimated peak current value Ipa1 may be calculated based on an equation (3). The correction coefficient β is used to estimate the estimated peak current value Ipa1 of the injection control, and is a coefficient calculated in advance based on the load characteristics of the fuel injection valve 2 and the like, and shows an offset term for accurately estimating the estimated peak current value Ipa1 at an application off timing of the energization current. Note that β has a negative value (is a negative intercept) in this example, such as negative five microamperes.

(Equation 3)

$$I_{pa1} = \frac{I_{t1}}{t_1} \times Ti + \beta \tag{3}$$

Further, here, the current gradient from the injection start instruction time t0 to the reach time t1 to reach the current threshold value It1 is used as the first term of the equation (3), but the current gradient from the injection start instruction time t0 to the reach time t2 to reach the current threshold value It2 (not shown) may also be used as the first term of the equation (3).

Next, the energization time correction amount calculator 5d calculates the energization time correction amount ΔTi for compensating for the shortage energy Ei. Specifically, as shown in an equation (4), the energization time correction amount calculator 5d calculates the energization time correction amount ΔTi by dividing the calculated shortage energy Ei by the estimated peak current value Ipa1.

(Equation 4)

$$\Delta Ti = Ei \div I_{pa1} \tag{4}$$

$$= \frac{\{(t_1 - t_{1n}) + (t_2 - t_{2n})\} \times (I_2 - I_1) \times \left(\frac{1}{1024 \times 0.03}\right) \div 2 \times \alpha}{\frac{I_{t1}}{t_1} \times \left(\frac{1}{1024 \times 0.03}\right) \times Ti + \beta}$$

$$= \frac{\{(t_1 - t_{1n}) + (t_2 - t_{2n})\} \times (I_2 - I_1) \times \left(\frac{1}{1024 \times 0.03}\right) \times \alpha 2 \times t_1}{\left\{I_{t1} \times \left(\frac{1}{1024 \times 0.03}\right) \times Ti\right\} + \beta \times t_1}$$

The denominator and numerator $1/(1024 \times 0.03)$ in the equation (4) represent a gain for converting the A/D conversion value of the detection current I into a physical quantity. Further, $\alpha 2 = \alpha/2$. By deriving the energization time correction amount $\Delta Ti$ using the equation (4), which depends on the shortage energy Ei and the estimated peak current value Ipa1, an extension time to compensate for the shortage energy Ei can be easily calculated with drastically reduced calculation amount.

When the energization time correction amount calculator 5d outputs the calculated energization time correction amount $\Delta Ti$ to the energization controller 5b, the energization controller 5b corrects the energization instruction time Ti during a period before a timing tb when the detected current I detected by the current monitor 5c reaches the estimated peak current value Ipa1, by using the energization instruction calculated value of the instruction TQ+ the energization time correction amount $\Delta Ti$ as the effective energization instruction time of the instruction TQ. As a result, the energization instruction time Ti of the instruction TQ can be easily corrected, and the energization instruction time Ti can be extended. By using such a method, it is not necessary to adjust the energization instruction time Ti in anticipation of variation thereof in order to prevent misfire, and misfire countermeasures can be taken without deteriorating fuel efficiency as much as possible.

The energization time correction amount calculator 5d calculates the energization time correction amount $\Delta Ti$ during a period between the time when the current threshold value It2 is reached and the time when the estimated peak current value Ipa1 is reached. Therefore, the energization instruction time Ti can be corrected with a margin (i.e., well in advance/correction of Ti appropriately performable with sufficient calculation time). Although an example of calculating the energization time correction amount $\Delta Ti$ based on the equations (1) to (4) is shown, these equations show an example only and the correction method is not limited to such method.

Figure 12:
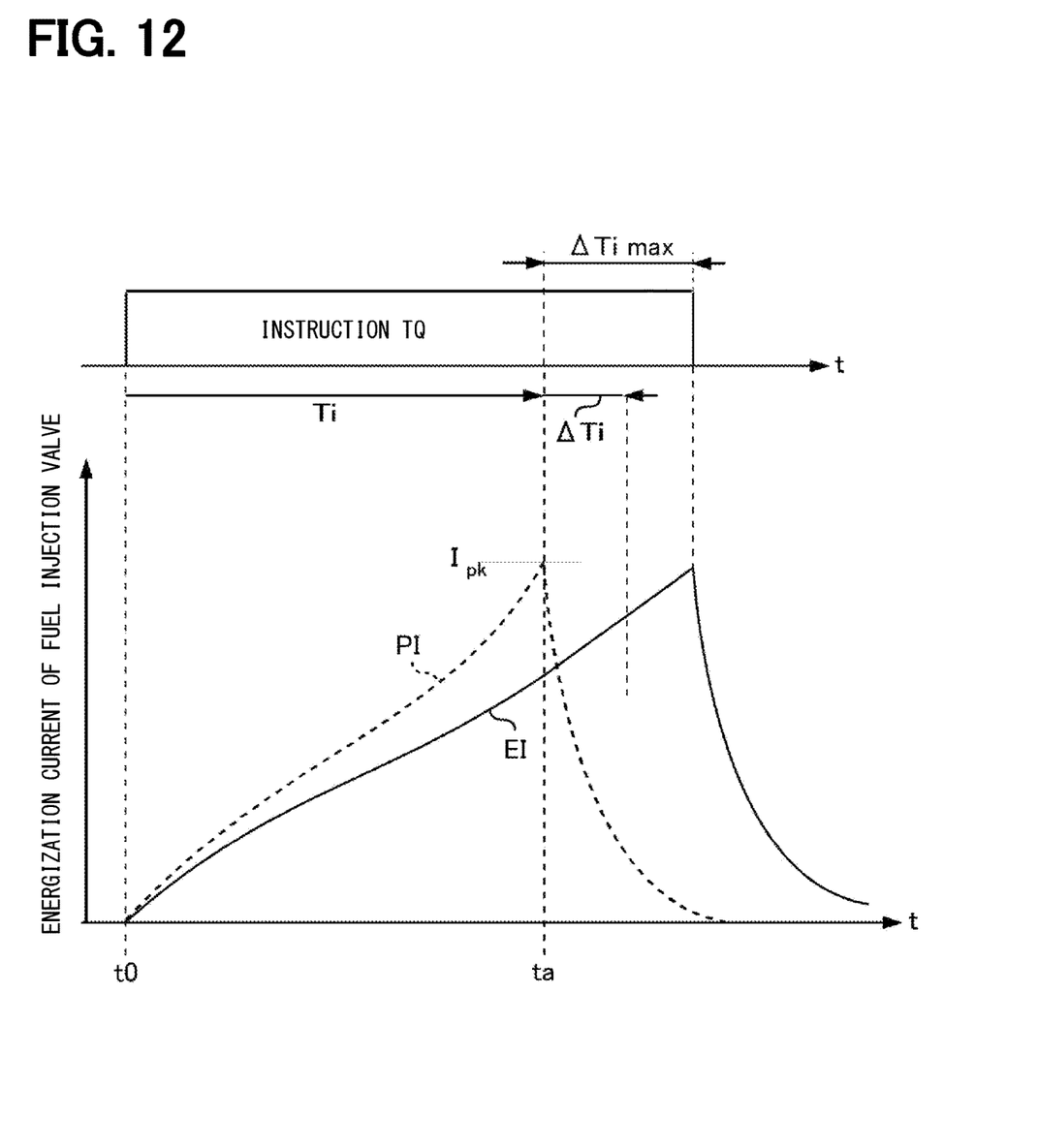
FIG. 12 is an explanatory diagram of an operational effect due to an upper limit guard value.

In order to prevent overcorrection of the energization time correction amount $\Delta Ti$ while preventing abnormal control by the control IC 5, the microcontroller 4 sets the upper limit guard value $\Delta Timax$ of the energization time correction amount $\Delta Ti$ in advance by the upper limit guard value setter 11, and sends the upper limit guard value $\Delta Timax$ to the control IC 5. Therefore, as shown in FIG. 12, the control IC 5 can set the energization time correction amount $\Delta Ti$ with the upper limit guard value $\Delta Timax$ of the energization time correction amount $\Delta Ti$ as the upper limit value, thereby preventing an in-cylinder injection with an unintended injection amount setting. As a result, the energization time correction technique can be appropriately operated.

Other Embodiments

The present disclosure should not be limited to the embodiments described above, and various modifications may further be implemented without departing from the gist of the present disclosure. For example, the following modifications or extensions are possible. The multiple embodiments described above may be combined as necessary.

In a steady operation state such as a catalyst rapid warm-up operation, the energization time correction amount $\Delta Ti$ tends to be set to the substantially same amount on the control IC 5 side. If the energization time correction amount $\Delta Ti$ can be set to a constant value by setting the upper limit guard value $\Delta Timax$, an in-cylinder injection will not occur with an unintended injection amount setting.

In the above-described embodiment, the control IC 5 calculates the integrated current difference $\Sigma \Delta I1$ by calculating/approximating the trapezoidal area of the energization current of the fuel injection valve 2, but the present disclosure is not limited to such example. The energization current of the fuel injection valve 2 changes non-linearly at both timing before reaching the target peak current Ipk and after reaching the target peak current Ipk. Therefore, it may be preferable to simply calculate the integrated current difference by approximately calculating the integrated current of the energization current using a polygon such as a triangle, a rectangle, a trapezoid and the like. As a result, the amount of calculation can be dramatically reduced.

The functions of the microcontroller 5 and the control IC 6 may be integrally configured. In particular, when it is necessary to increase the speed of arithmetic processing, it is desirable that the microcontroller 5 integrates the functions of the control IC 6 and is configured by (i.e., implemented as) an arithmetic processing unit capable of high-speed arithmetic.

The means and/or functions provided by the microcontroller 4 and the control IC 5 can be provided by software recorded in a substantive memory device and a computer that executes the software, or by software, or by hardware, or by a combination thereof. For example, when a control device is provided by an electronic circuit that is hardware, it can be configured by a digital circuit or an analog circuit including one or more logic circuits. Further, for example, when the control device executes various controls by software, a program is stored in a storage unit, and a control entity executing the program implements a method corresponding to the program.

Embodiments described above may be combined to implement the control of the present disclosure. In addition, the reference numerals in parentheses described in the claims simply indicate correspondence to the concrete means described in the embodiments, which is an example of the present disclosure. That is, the technical scope of the present disclosure is not necessarily limited thereto. A part of the above-described embodiment may be dispensed/dropped as long as the problem identified in the background is resolvable. In addition, various modifications from the present disclosure in the claims are considered also as an embodiment thereof as long as such modification pertains to the gist of the present disclosure.

Although the present disclosure has been described in accordance with the above-described embodiments, it is understood that the present disclosure is not limited to the embodiments and structures. The present disclosure encompasses various modifications and variations within the scope of equivalents. In addition, various modes/combinations, one or more elements added/subtracted thereto/therefrom, may also be considered as the present disclosure and understood as the technical thought thereof.

What is claimed is:

1. An injection control device comprising:
    an area correction unit calculating an energization time correction amount by performing area size correction of an electric current flowing through a fuel injection valve when the fuel injection valve is driven by electric current to inject fuel from the fuel injection valve;
    an injection instruction state determiner determining an injection instruction overlapping state, regarding cylinders into which fuel is sequentially injected; and
    an upper limit guard value setter setting an upper limit guard value of the energization time correction amount based on the inter-cylinder injection instruction state determined by the injection instruction state determiner.

2. The injection control device of claim 1, wherein the injection instruction state determiner determines the injection instruction overlapping state based on an injection mode representing the number of injections for each cylinder in one cycle.

3. The injection control device of claim 1 further comprising:
a charging unit holding electric power supplied to the fuel injection valves of the cylinders, wherein
the injection instruction state determiner determines the inter-cylinder injection instruction state based on (i) an injection start instruction time and an energization instruction time for the fuel injection valve of each of the cylinders which are driven by the same charging unit or (ii) the injection instruction interval for the fuel injection valve of each of the cylinders which are driven by the same charging unit.

4. The injection control device of claim 1, wherein
when the injection instruction state determiner determines that the injection instruction overlapping state does not occur, the upper limit guard value setter sets a greater upper limit of the energization time correction amount as the inter-cylinder injection instruction interval is shortened.

5. The injection control device of claim 1, wherein
when the injection instruction state determiner determines that it is in an injection instruction overlapping state, the upper limit guard value setter sets the upper limit guard value of the energization time correction amount to a maximum value.

6. An injection control device comprising:
a controller; and
a non-transitory computer-readable storage, wherein the injection control device is configured to:
calculate an injection end instruction time for a first cylinder based on an injection start instruction time plus an energization time;
calculate an instruction interval based on a start time of a next cylinder minus the injection end instruction time for the first cylinder;
determine whether the instruction interval is less than zero;
upon a determination that the instruction interval is less than zero, set an upper limit guard value to an overlapping value; and
upon a determination that the instruction interval is NOT less than zero, set the upper limit guard value to a non-overlapping value that is less than the overlapping value.

7. The injection control device of claim 6, wherein the non-overlapping value is a function of the instruction interval such that that:
the non-overlapping value decreases as the instruction interval increases in a range between zero and a threshold interval; and
the non-overlapping value has a constant value when the instruction interval is greater than the threshold interval.

8. The injection control device of claim 6, wherein the non-overlapping value decreases linearly as the instruction interval increases in a range between zero and the threshold interval.

9. The injection control device of claim 6, wherein the injection control device is configured to:
calculate a first area located substantially between an ideal energization current curve and an actual energization current curve; and
use the first area to calculate an energization correction time such that an area under the ideal energization current curve and an area under the actual energization current curve are approximately equal;
limit the energization correction time to a value not greater than the upper limit guard value; and
transmit a boosted voltage during a corrected energization time, wherein the corrected energization time equals an uncorrected time plus the limited energization correction time.

10. The injection control device of claim 9, wherein the first area is calculated based upon a trapezoid with four corners:
(i) a lower left corner on the ideal energization current curve;
(ii) an upper left corner on the ideal energization current curve;
(iii) a lower right corner on the actual energization current curve; and
(iv) an upper right corner on the actual energization current curve, wherein
the lower corners are on a lower constant current line, and the upper corners are on an upper constant current line.

11. The injection control device of claim 9, wherein the injection control device is further configured to:
estimate a shortage charge by multiplying the first area with a correction coefficient.

12. The injection control device of claim 9, wherein the injection control device is further configured to:
estimate a peak current for the actual energization current curve based on a first straight line having a first slope and a first intercept.

13. The injection control device of claim 12,
wherein the first slope is a slope of an early portion of the actual energization current curve,
wherein the first intercept has a negative value.

14. The injection control device of claim 13, wherein the injection control device is further configured to:
calculate an energization time correction amount based on the shortage charge divided by the estimated peak current value.

15. The injection control device of claim 14, wherein calculating the energization time correction amount includes corrections for analog/digital conversions of measurements.

* * * * *